United States Patent
Rizzi

(10) Patent No.: US 11,885,470 B2
(45) Date of Patent: Jan. 30, 2024

(54) OPTICAL DEVICE

(71) Applicant: VALEO VISION, Bobigny (FR)

(72) Inventor: Julien Rizzi, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/782,098

(22) PCT Filed: Nov. 30, 2020

(86) PCT No.: PCT/EP2020/083874
§ 371 (c)(1),
(2) Date: Jun. 2, 2022

(87) PCT Pub. No.: WO2021/110581
PCT Pub. Date: Jun. 10, 2021

(65) Prior Publication Data
US 2023/0003356 A1  Jan. 5, 2023

(30) Foreign Application Priority Data

Dec. 3, 2019 (FR) ..................................... 1913675

(51) Int. Cl.
*F21S 41/255* (2018.01)
*G02B 1/00* (2006.01)
(Continued)

(52) U.S. Cl.
CPC ............ *F21S 41/255* (2018.01); *F21V 5/008* (2013.01); *G02B 1/00* (2013.01); *G02B 19/0066* (2013.01);
(Continued)

(58) Field of Classification Search
CPC ....... F21V 5/008; F21S 41/153; F21S 41/663; F21S 41/255; G02B 19/0066; G02B 1/00
See application file for complete search history.

(56) References Cited

U.S. PATENT DOCUMENTS 5,386,312 A * 1/1995 Spencer ................. G02B 13/00
359/215.1
2007/0024977 A1  2/2007 Kawamura et al.
(Continued)

FOREIGN PATENT DOCUMENTS

CN  107957050 A * 4/2018
EP  2431658 A2 * 3/2012  ............. F21V 11/06
(Continued)

OTHER PUBLICATIONS

International Search Report dated Feb. 15, 2021 in PCT/EP2020/083874 filed on Nov. 30, 2020, 3 pages.
(Continued)

*Primary Examiner* — Erin Kryukova
(74) *Attorney, Agent, or Firm* — Oblon, McClelland, Maier & Neustadt, L.L.P.

(57) ABSTRACT

An optical device for projecting light beams that is able to interact with a pixelated light source comprising a plurality of selectively activatable emitting elements. The device successively includes, in the direction of the path of the light rays, a first optical unit, a pupil and a second optical unit. The first optical unit includes an output diopter located at a first distance ($d_1$) from the pupil, and the second optical unit includes an input diopter interface located at a second distance ($d_2$) from the pupil, the second distance ($d_2$) being substantially identical to the first distance ($d_1$). The first unit includes a converging lens, and the second unit includes a doublet of lenses one of which is made of flint glass and the other of which is made of crown glass.

21 Claims, 4 Drawing Sheets

(51) Int. Cl.
*G02B 19/00* (2006.01)
*F21V 5/00* (2018.01)
*F21Y 115/10* (2016.01)
*F21S 41/153* (2018.01)
*F21S 41/663* (2018.01)

(52) U.S. Cl.
CPC ............ *F21S 41/153* (2018.01); *F21S 41/663* (2018.01); *F21Y 2115/10* (2016.08)

(56) References Cited

U.S. PATENT DOCUMENTS

| | | | |
|---|---|---|---|
| 2011/0122598 A1 | 5/2011 | Chang | |
| 2015/0138446 A1 | 5/2015 | Sheng | |
| 2017/0234497 A1 | 8/2017 | Courcier et al. | |
| 2018/0313510 A1* | 11/2018 | Albou | F21S 41/285 |
| 2019/0086051 A1* | 3/2019 | Motohashi | F21S 41/153 |
| 2019/0257492 A1* | 8/2019 | Motohashi | F21S 41/143 |
| 2020/0180504 A1* | 6/2020 | Kim | F21S 41/285 |

FOREIGN PATENT DOCUMENTS

| | | | |
|---|---|---|---|
| FR | 3044743 A1 | * | 6/2017 |
| FR | 3 047 794 A1 | | 8/2017 |
| GB | 1162911 | | 9/1969 |
| JP | 6-167659 A | | 6/1994 |
| JP | 11-183796 A | | 7/1999 |
| JP | 2017-9778 A | | 1/2017 |
| JP | 2019-119344 A | | 7/2019 |
| JP | 2019-200339 A | | 11/2019 |
| KR | 20180023299 A | * | 3/2018 |

OTHER PUBLICATIONS

Anonymous: "Crown glass (optics)—Wikipedia", Aug. 18, 2020 (XP055723390), URL:https://en.wikipedia.org/Wiki/Crown_glass_(optics) [retrieved on Aug. 18, 2020]. 1 Page.

Japanese Office Action dated Jul. 13, 2023 in Japanese Patent Application No. 2022-533211 (with English Translation), 28 pages.

* cited by examiner

OPTICAL DEVICE

TECHNICAL FIELD

The present invention relates to the field of lighting and/or signaling and to the units, optical units in particular, that contribute thereto. It is particularly advantageously applicable to the field of motor vehicles.

It may be used to display pictograms on a surface of projection of the exiting light, to perform a function whereby the road is written upon. At the same time, this beam may, in particular, be used to form a high beam, preferably in association with a complementary beam.

For example, the beam produced by the invention may form part of an overall high beam, while having a resolution high enough to allow a function whereby the road is written upon to be performed, and be completed by another beam that for example has a field of lateral projection that is wider, but possibly of lower resolution.

PRIOR ART

In the automotive sector, devices capable of emitting light beams, also called lighting and/or signaling functions, that generally comply with regulations, are known.

Technologies that allow a segmented beam, also called a pixelated beam, to be produced, in order to perform advanced lighting functions, have recently been developed. For example, the invention may allow a pixelated light beam, which is preferably of high resolution, to be produced, in particular for signaling purposes and/or to contribute to functions that light in front of a vehicle.

The beam, which results from the various beam segments generated by each of the diodes, is projected by way of a projecting optical device generally comprising one or more lenses. For example, it is possible to produce a complementary high beam, which is associated with a basic beam that is entirely or at least mainly projected below a horizontal cutoff line of the type used for the low-beam function, the complementary high beam being added to the basic beam so as to complete it above the cut-off line; advantageously, this high beam is adaptive, i.e. certain portions of the projected overall beam may be turned on or off, for example for anti-glare functions. The acronym ADB (for adaptive driving beam) is used for this type of function.

In the present description, a beam the projection of which forms an image composed of beam segments, each segment being able to be turned on independently, is called a segmented beam. A pixelated light source may be employed to form these segments. Such a source comprises a plurality of selectively activatable emissive elements. The emissive elements are typically placed beside one another on a carrier, with a certain pitch.

In an ideal situation, the size of the source is not constrained, and hence a wide visual field may be covered so as not to limit applications. Furthermore, also in theory, the resolution (i.e. the number of pixels) of the light sources is unlimited, this allowing a very fine definition.

In practice, reasons regarding limitation of complexity and cost require compromises to be sought, and hence resolution is in fact limited.

One subject of the present invention is in particular to provide a solution to this problem, allowing resolutions that are satisfactory, in particular for ADB beams, to be permitted.

Other aims, features and advantages of the present invention will become apparent on examining the following description and the accompanying drawings. It will be understood that other advantages may be incorporated.

SUMMARY

To achieve this objective, according to one embodiment, provision is made of an optical device for projecting light beams that is able to interact with a pixelated light source comprising a plurality of selectively activatable emissive elements, characterized in that it comprises, in succession, in the direction of travel of the light rays, a first optical unit, a pupil and a second optical unit, the first optical unit comprising an exit dioptric interface located at a first distance ($d_1$) from the pupil, the second optical unit comprising an entrance dioptric interface located at a second distance ($d_2$) from the pupil, the second distance ($d_2$) being substantially identical to the first distance ($d_1$), and in that the first unit comprises a convergent lens, and in that the second unit comprises a lens doublet, one of the lenses of which doublet is made of flint glass and the other of the lenses of which doublet is made of crown glass. Advantageously, the lens of the lens doublet that is made of flint glass is divergent, and the lens of the lens doublet that is made of crown glass is convergent.

Thus, a segmented beam having a resolution potentially higher than the resolution currently encountered, in particular in beams contributing to high beams, is produced. On-road writing applications that are conventionally not envisioned in the context of ADB beams are thus accessible by virtue of the invention.

While having an improved resolution, aberrations are curbed via the symmetry of the optical elements located on either side of a pupil and via the use, in the second unit, which forms an exit unit, of a lens doublet made up of an alternation of flint-glass and crown-glass lenses. This alternation in particular allows chromatic aberration, which aberration is often the limiting one (potentially even causing a product to be in breach of regulations) on account of the numerical apertures required for high beams, to be curbed. In addition, in the same way that the Abbe numbers of the flint and crown glass are preferably chosen to compensate for the resulting chromatic aberration of the beam, the coefficients of thermal expansion of the flint and crown glasses are preferably chosen so that the thermal expansion of each lens compensates for that of the other, thus allowing an optimal preservation of performance over the widest possible temperature range.

In this context, one advantage of the present invention is to exploit the ability to selectively activate the various segments of the beam to achieve an improved ADB highbeam function, while allowing the ground to be written upon, this normally requiring a resolution higher than that of ADB beams. These two functions are thus cleverly associated, by means of the same projecting module.

Optionally, the first optical unit comprises a first convergent lens forming the entrance dioptric interface of the first optical unit, and a second convergent lens immediately following the first lens.

By virtue of these arrangements, the first convergent lens may be used as a field aperture lens, to define the angular amplitude of the projected beam. This lens may also serve as an aperture lens: it may be placed close to the light source (in particular between 3 and 6 millimeters and preferably at 5 millimeters therefrom); and its positive meniscus shape, which is preferably of high radii of curvature, allows rays emitted by the source that have very large angles to be collected.

Advantageously, the optical device comprises flint-glass lenses and crown-glass lenses that are alternated so as to form a balanced optical assembly limiting chromatic aberrations; preferably, the first optical unit comprises one doublet and the second optical unit comprises another doublet, these two doublets being symmetrical so as to have a limited coma. The use of flint- and crown-glass lenses in alternation also has the advantage of allowing, in addition to correction of chromatic aberration, performance to be optimized over a large temperature range through compensation for thermal expansion.

Another aspect relates to a light-emitting module comprising a device and a pixelated light source that is equipped with a plurality of selectively activatable emissive elements, and that is configured to emit a segmented light beam.

Another aspect relates to a motor vehicle equipped with at least one device and/or at least one module.

BRIEF DESCRIPTION OF THE FIGURES

The aims, objects, features and advantages of the invention will become more clearly apparent from the detailed description of one embodiment of the latter, which embodiment is illustrated by the following accompanying drawings, in which.

Figure 1:
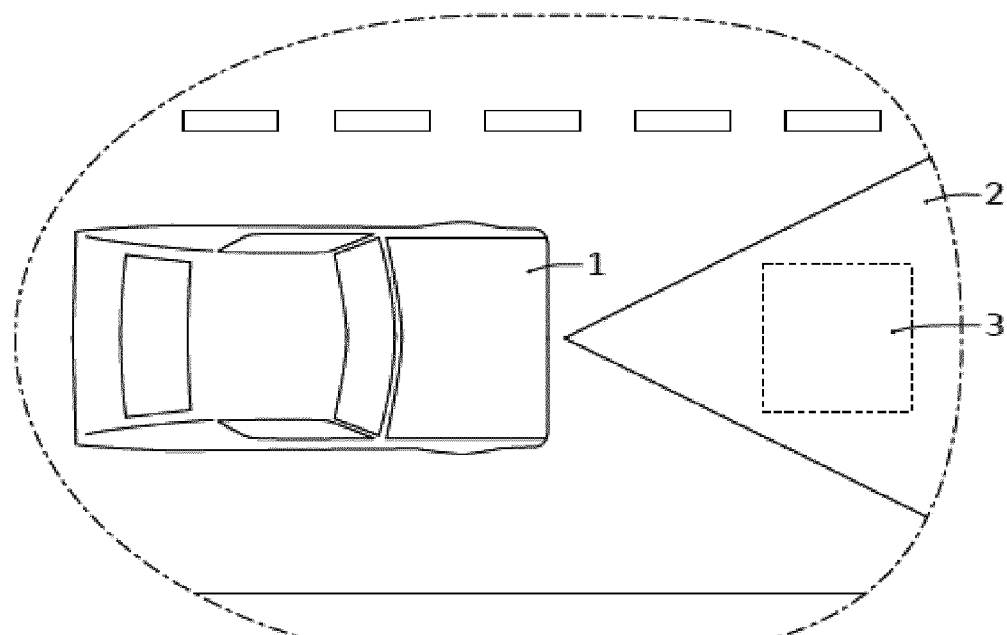
FIG. 1 shows an example of projection of a light beam produced by the invention in front of a motor vehicle.

The drawings are given by way of example and do not limit the invention. They are schematic conceptual depictions intended to facilitate understanding of the invention and are not necessarily drawn to the scale of practical applications.

DETAILED DESCRIPTION

Before starting a detailed review of embodiments of the invention, optional features that may optionally be used in combination or alternatively will now be described:

- the first optical unit comprises a first convergent lens forming the entrance dioptric interface of the first optical unit, and a second convergent lens immediately following the first lens;
- the entrance dioptric interface has a meniscus shape;
- the first optical unit comprises a divergent lens, immediately following the second lens;
- the second lens and the divergent lens form a lens doublet, one of the lenses of which doublet is made of crown glass and the other of the lenses of which doublet is made of flint glass;
- the lenses of the lens doublet of the first unit and of the lens doublet of the second unit are flint-glass and crown-glass lenses alternated in the direction of travel of the light rays;
- the second lens comprises an entrance dioptric interface located at a third distance ($d_3$) from the pupil, and the lens doublet of the second optical unit comprises an exit dioptric interface located at a fourth distance ($d_4$) from the pupil, the third distance ($d_3$) and the fourth distance ($d_4$) being substantially identical;
- the doublet of the first optical unit and the doublet of the second optical unit have an identical optical power, this covering the case where they are very close (i.e. differ by no more than 10%);
- the first optical unit and/or the second optical unit comprise/comprises at least one flint-glass lens having a refractive index at least equal to 1.6, preferably at least equal to 1.7, and preferably at least equal to 1.8;
- the first optical unit and/or the second optical unit comprise/comprises at least one crown-glass lens having a refractive index at least equal to 1.45, preferably at least equal to 1.5, and preferably at least equal to 1.65;
- the device has a numerical aperture less than 1, preferably less than 0.9, and preferably less than or equal to 0.75;
- the flint-glass lenses have an Abbe number <50 and preferably <45 and/or the crown-glass lenses have an Abbe number greater than 45 and preferably greater than 50;
- the light beam performs a function whereby the ground is written upon;
- the light beam forms at least one portion of an overall high beam;
- optionally, the emissive elements are identical in size;
- a computer program product, which is preferably stored in a non-volatile memory, comprises instructions that, when they are executed by a processor, make it possible to determine the emissive elements to be activated, in particular to obtain at least one dark region (in which the elements are not activated) of a determined area or pattern to be projected.

In the features described below, terms relating to verticality, horizontality and transversality (or even the lateral direction), or equivalents thereof, are to be understood with respect to the position in which the lighting system is intended to be fitted in a vehicle. The terms "vertical" and "horizontal" are used in the present description to designate, regarding the term "vertical", a direction with an orientation perpendicular to the plane of the horizon (which corresponds to the height of the modules), and, regarding the term "horizontal", a direction with an orientation parallel to the plane of the horizon. They are to be considered under the conditions of operation of the device in a vehicle. The use of these words does not mean that slight variations about the vertical and horizontal directions are excluded from the invention. For example, an inclination relative to these directions of the order of + or −10° is here considered to be a minor variation about the two preferred directions. With respect to the horizontal plane, the inclination is in principle between −5° and +4°, and it is between −6° and +7.5° laterally.

Motor-vehicle headlamps may be equipped with one or more light-emitting modules arranged in a casing closed by an outer lens so as to obtain one or more lighting and/or signaling beams as output from the headlamp. Simplistically, a light-emitting module of the casing in particular comprises a light source that emits a light beam, an optical device comprising one or more lenses and, in certain cases, an optical element, for example a reflector, for orienting the light rays generated by the light sources, in order to form the light beam output from the optical module. The situation is identical for rear lights.

The invention may contribute to a high-beam function the purpose of which is to illuminate a large extent of the scene in front of the vehicle, but also to a distance away that is substantial, and typically about two hundred meters. This light beam, due to its lighting function, is mainly located above the horizon line. It may for example have a slightly upward sloping lighting optical axis. In particular, it may be used to generate a "complementary high-beam" lighting function that forms a segment of a high beam complementary to the segment produced by a near-field beam, the complementary high beam being at least partially intended to illuminate above the horizon line.

However, in a non-limiting context of application to a function whereby the ground is written upon, it is desirable for the segmented beam to be projected at least 10 m from the headlamp so that, given his speed, the driver has time to see and to interpret the information. This distance of 10 m may correspond to an angular value below the horizontal, depending on the height of the position of the headlamp on the vehicle when the latter is being driven. For example, in a sports car, the headlamp will be about 60 cm from the ground, this implying that the 10 m distance corresponds to 3.44° below the horizontal; as another example, for a standard passenger vehicle, the headlamp is generally at about 75 cm from the ground, this corresponding to an angle of 4.29° below the horizontal. Lastly, according to another example, for a 4×4 or SUV (semi-commercial vehicles), the headlamp is in general at about 90 cm from the ground, and hence in this case 10 m corresponds to 5.15°. Likewise, it is generally considered that it is futile to project beyond 50 m or that unattainable brightnesses are required for the image to be clearly visible beyond 50 m. This 50 m corresponds to 0.69°, 0.86° and 1.03° below the horizontal for headlamps at 0.6 m, 0.75 m and 0.9 m from the ground, respectively. In conclusion, to cover the entire useful range of projection onto the ground, it is necessary to cover an angular range below the horizontal ranging from −0.6° to −5.5° or even −6°.

This arrangement allows functions whereby pictograms are displayed to be performed, these being very useful as a means of conveying information to, for example, the driver. It is thus possible, by way of illustration, to display an arrow on the traffic lane being driven in, so as to bring back to mind information about a desirable turn or change in direction. Obviously, the shape of the pictograms is not limited by the invention.

The device may also serve to form other lighting functions via or apart from those described above in particular in relation to adaptive beams.

A vehicle may be equipped with a module of the invention, and, preferably, said vehicle is also equipped with at least one other module for projecting at least one other beam. A headlamp may also be complex and comprise a plurality of modules that may, furthermore, optionally share components.

According to the invention, certain dioptric interfaces are placed at identical distances about the pupil. The expression "substantially identical" means distances that may be qualified similar in the targeted application, i.e. of a sufficiently similar size to produce the desired technical effect, in particular in terms of resolution level. For example, in respect of the distances $d_1$ and $d_2$, these distances are considered to be substantially identical if the value of one does not differ by more than 10% from the value of the other. By way of illustration, they may be equal to 10 mm+/−1 mm. For example, in respect of the distances $d_3$ and $d_4$, these distances are considered to be substantially identical if the value of one does not differ by more than 20% from the value of the other.

FIG. 1 shows a vehicle 1 in front of which a beam 2 is being projected. FIG. 1 also depicts the ability to perform a function whereby the ground is written upon, in a region 3. This ability may particularly advantageously be used to generate the patterns of pictograms. Only one pictogram may be projected. A plurality of pictograms may also be displayed simultaneously or in alternation. The functions whereby the ground is written upon may also be activated in an ADB situation.

The projected beam may be generated by a light source 4, which is schematically shown in the following figures, and preferably produced with a plurality of emissive elements. It will be noted that the plurality of emissive elements may be controlled so as to be activated selectively. This means that all the emissive elements are not necessarily active, i.e. emit light, simultaneously. This function allows the shape of the generated beam to be modulated. In the case where an emissive element is not activated, its image, such as projected by the optical device, will be absent. An illumination vacuum is thus created in the resulting overall beam.

The source 4 preferably comprises a carrier, one side of which bears selectively activatable emissive elements, for example based on LED technologies, as described in detail below.

Figure 2A:
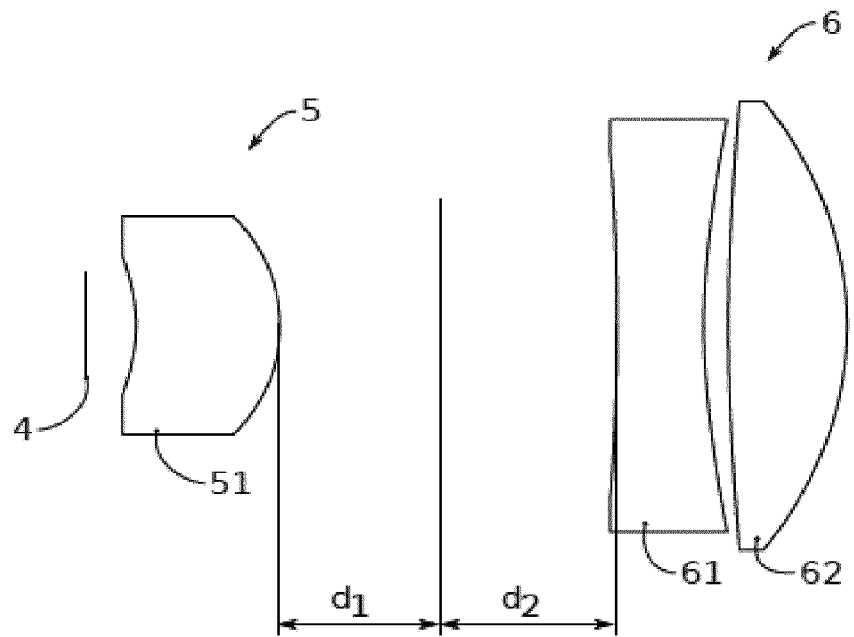
FIGS. 2A and 2B show a first embodiment of an optical device.

As schematically shown in FIG. 2A in particular, the light source 4 is advantageously centered on, and perpendicular to, the optical axis of the optical device, which here has been represented by groups (units 5 and 6 below) of lenses. The optical axis may be oriented substantially horizontally.

The light source 4 may in particular take the form of a matrix array of emissive elements that may be activated individually, so as to turn off or turn on any one of the emissive elements. The shape of the resulting beam may thus varied with a very high degree of flexibility. Purely by way of illustration, it is possible to employ a matrix array of emissive elements, for example forming 2464 or more pixels, arranged in rows and columns, 28 rows and 88 or 132 columns for example.

As known per se, the present invention may use light-emitting diodes (also commonly called LEDs) as light sources. These may potentially be one or more organic LEDs. These LEDs may in particular comprise at least one semiconductor chip able to emit light. Moreover, the expression light source is here understood to mean a set of at least one elementary source such as an LED able to produce a flux that causes at least one light beam to be output from the module of the invention. In one advantageous embodiment, the exit face of the source is of rectangular cross section, this being typical for LED chips.

The light source preferably comprises at least one monolithic matrix array of electroluminescent elements, also called a monolithic matrix array. In a monolithic matrix array, the electroluminescent elements are grown from a common substrate, or have been transferred thereto, and are electrically connected so as to be able to be actuated selectively, individually or in subsets of electroluminescent elements. The substrate may be made mainly of semiconductor. The substrate may comprise one or more other materials, which are for example non-semiconductors. Each electroluminescent element or group of electroluminescent elements may thus form one luminous pixel and is able to emit light when its or their material is supplied with electricity. The configuration of such a monolithic matrix array allows selectively activatable pixels to be arranged very close to one another, with respect to conventional light-emitting diodes, which are intended to be soldered to printed circuit boards. In the context of the invention, the monolithic matrix array comprises electroluminescent elements a main dimension of elongation of which, namely height, is substantially perpendicular to a common substrate, this height being at most equal to one micron.

Advantageously, the one or more monolithic matrix arrays able to emit light rays may be coupled to a control unit for controlling the light emission of the pixelated source. The control unit may thus control (or drive) the generation and/or the projection of a pixelated light beam by the light-emitting device. The control unit may be integrated into the light-emittting device. The control unit may be mounted on one or more of the matrix arrays, the assembly thus forming a light-emitting module. The control unit may comprise a central processing unit coupled to a memory storing a computer program that comprises instructions allowing the processor to perform steps that generate signals allowing the light source to be controlled. The control unit may thus for example individually control the light emission of each pixel of a matrix array. Furthermore, the luminance obtained by the plurality of electroluminescent elements is at least 60 Cd/mm$^2$, and preferably at least 80 Cd/mm$^2$.

The control unit may form an electronic device able to control the electroluminescent elements. The control unit may be an integrated circuit. An integrated circuit, also called an electronic chip, is an electronic component that reproduces one or more electronic functions and that is able to incorporate a plurality of types of basic electronic component, for example in a limited volume (i.e. on a small wafer). This makes the circuit easy to implement. The integrated circuit may be for example an ASIC or an ASSP. An ASIC (acronym of application-specific integrated circuit) is an integrated circuit developed for at least one specific application (i.e. for one customer). An ASIC is therefore a specialized (microelectronic) integrated circuit. Generally speaking, it performs a high number of unique or made-to-measure functions. An ASSP (acronym of application-specific standard product) is an integrated (microelectronic) electronic circuit that performs a high number of functions in order to meet the requirements of a generally standardized application. An ASIC is designed for a more particular (specific) need than an ASSP. The monolithic matrix arrays are supplied with electricity via the electronic device, which is itself supplied with electricity using for example at least one connector connecting it to a source of electricity. The source of electricity may be internal or external to the device according to the invention. The electronic device supplies electricity to the light source. The electronic device is thus able to control the light source.

According to the invention, the light source preferably comprises at least one monolithic matrix array the light-emitting elements of which protrude from a common substrate. This arrangement of elements may result from growth on the substrate, from which substrate said elements were respectively grown, or from any other production method, for example transfer of the elements using transfer techniques. Various arrangements of electroluminescent elements may meet this definition of a monolithic matrix array, provided that the electroluminescent elements have one of their main dimensions of elongation substantially perpendicular to a common substrate and that the spacing between pixels formed by one or more electrically grouped together electroluminescent elements is small in comparison with the spacings required in known arrangements of flat square chips soldered to a printed circuit board.

In particular, the light source according to one aspect of the invention may comprise a plurality of separate electroluminescent elements that are grown individually from the substrate but that are electrically connected so as to be selectively activatable, where applicable in subsets of simultaneously activatable rods.

According to one embodiment (not shown), the monolithic matrix array comprises a plurality of electroluminescent elements, of submillimeter dimensions, or even of dimensions smaller than 10 µm, that protrude from a substrate so as to form rods with a hexagonal cross section. The light-emitting rods extend parallel to the optical axis of the light-emitting module when the light source is in position in the casing.

These light-emitting rods are grouped, in particular via electrical connections specific to each set, into a plurality of selectively activatable segments. The electroluminescent rods are rooted on a first side of a substrate. Each electroluminescent rod, formed here using gallium nitride (GaN), protrudes perpendicularly, or substantially perpendicularly, from the substrate, which here is based on silicon, with other materials such as silicon carbide being usable without departing from the scope of the invention. By way of example, the electroluminescent rods could be made of an alloy of aluminum nitride and of gallium nitride (AlGaN), or of an alloy of aluminum, indium and gallium phosphide (AlInGaP). Each electroluminescent rod extends along an axis of elongation defining its height, the base of each rod being placed in a plane of the front side of the substrate.

According to one other embodiment (not shown), the monolithic matrix array may comprise electroluminescent elements formed from electroluminescent-element layers, in particular a first layer of n-doped GaN and a second layer of p-doped GaN, grown epitaxially on a single substrate, for example one made of silicon carbide, and which are sliced (by grinding and/or ablation) to form a plurality of pixels located on the same substrate. The result of such a design is a plurality of electroluminescent blocks that are all located on the same substrate and that are electrically connected so that each thereof can be selectively activated.

In one example of realization according to this other embodiment, the substrate of the monolithic matrix array may have a thickness comprised between 100 µm and 800 µm, and in particular equal to 200 µm; each block may have a length and a width, each being comprised between 50 µm and 500 µm, and preferably comprised between 100 µm and 200 µm. In one variant, the length and width are equal. The height of each block is smaller than 500 µm, and preferably smaller than 300 µm. Lastly, the exit surface of each block may be formed via the substrate, on the side opposite the one on which the epitaxial growth is performed. The distance separating contiguous pixels may be smaller than 1 µm, in particular smaller than 500 µm, and it is preferably smaller than 200 µm.

With regard to monolithic chips of electroluminescent blocks:

The number of pixels may be comprised between 250 and several thousand. A typical value is about one thousand pixels.

Their overall shape is usually square, but may also be rectangular. Their aspect ratio is generally comprised between 1:1 and 1:5.

The size of a unit pixel (square in all known cases, but possibly rectangular) is between 100 and 300 µm or less (of the order of 40 µm in the latest generations of LEDs) in the current state of the art.

According to one other embodiment (not shown), which is applicable both to electroluminescent rods that respectively protrude from the same substrate, i.e. rods such as described above, and to electroluminescent blocks obtained by slicing electroluminescent layers superposed on the same substrate, the monolithic matrix array may furthermore comprise a layer of a polymer in which the electroluminescent elements are at least partially embedded. The layer may thus extend over the entire extent of the substrate, or only around a given group of electroluminescent elements. The polymer, which may in particular be silicone-based, creates a protective layer that allows the electroluminescent elements to be protected, without hindering the diffusion of the light rays. Furthermore, it is possible to integrate, into this layer of polymer, wavelength-converting means, luminophores for example, that are able to absorb at least some of the rays emitted by one of the elements and to convert at least some of said absorbed exciting light into emitted light having a wavelength different to that of the exciting light. The luminophores may either be embedded in the bulk of the polymer, or be arranged on the surface of the layer of this polymer. It is also possible to vacuum-deposit phosphors on semiconductor chips, without the polymer layer. The light source may furthermore comprise a coating of reflective material in order to deflect light rays toward the exit surfaces of the pixelated source.

The electroluminescent elements of submillimeter dimensions define, in a plane substantially parallel to the substrate, a given exit area. It will be understood that the shape of this exit area is dependent on the number and arrangement of the electroluminescent elements that form it. It is thus possible to define an emission area of substantially rectangular shape, though it will be understood that the latter may vary and be any shape without departing from the scope of the invention.

The selectively activatable emissive elements may be secondary light sources. For example, a source of primary light may illuminate the surface of mirrors of a micromechanical device, for example one comprising a digital micromirror device, selective reflection from the mirrors forming an emission of secondary light allowing pixels to be formed.

According to one possibility, the lateral angular sector covered by the field of view of the produced beam is larger than 14°, or even larger than or equal to 20° and/or preferably smaller than 30°.

By way of example, the matrix array of pixels of the source 4 may have a rectangular shape having an aspect ratio of at least 2, and/or of at most 4, between its largest dimension and its smallest dimension.

A first embodiment of the projecting system will now be described with reference to FIGS. 2A and 2B.

This configuration is the simplest of those illustrated. Specifically, the optical device comprises only three lenses. A first optical unit 5 then consists of a lens 51. The latter is advantageously a meniscus/convex lens. It may be made of crown glass. To limit the aberrations that it is liable to generate, its refractive index is advantageously relatively high, and for example at least equal to 1.65. This lens 51 may act as a field lens. Its optical power may be very low, or even zero.

In the illustrated embodiment, the light generated by the source 4 enters directly into the lens 51. Next, the light rays pass through a pupil 7 that acts as a diaphragm of preferably set aperture (so as to form a peripheral stop with respect to said rays) defining an aperture for passage of rays in the direction of a second optical unit 6. The latter comprises at least one doublet, here consisting of a lens 61 and of a lens 62. The lens 61 is divergent in nature. It here takes the form of a bi-concave lens, but it could have other configurations allowing a negative optical power to be obtained: for example, concave/plane or convex/concave configurations of suitable curvature may be good alternatives. Preferably, this lens is made of flint glass. Its index is advantageously higher than or equal to 1.7.

The symmetry between the first optical unit 5 and the second optical unit 6 will be noted. More precisely, the exit dioptric interface of the first optical unit 5, which dioptric interface is here formed by the exit face of the lens 51, is located at a distance $d_1$ from the pupil 7; in parallel, the entrance dioptric interface of the second optical unit 6, which dioptric interface is here formed by the entrance face of the lens 61, is located at a distance $d_2$ from pupil 7, on its other side. Provision is made for the distances $d_1$ and $d_2$ to be identical, to within the aforementioned conditions regarding dimensional tolerances.

The second lens 62 of the doublet of the optical unit 6 is advantageously a convergent lens; it may be made of crown glass, and preferably has a high refractive index, advantageously higher than or equal to 1.5, or even 1.65.

In the illustration of FIG. 2A, the lens 62 is bi-convex, but other arrangements allowing the desired convergence to be obtained are possible, such as a plano-convex lens, or a concave/convex lens of suitable curvature.

It will be noted that in this case it is advantageous to alternate at least some of the flint-glass and crown-glass lenses, as in the following embodiments, at least in each of the doublets.

Advantageously, at least some, and preferably all, of the dioptric interfaces of the lenses are spherical (or plane).

Figure 2B:
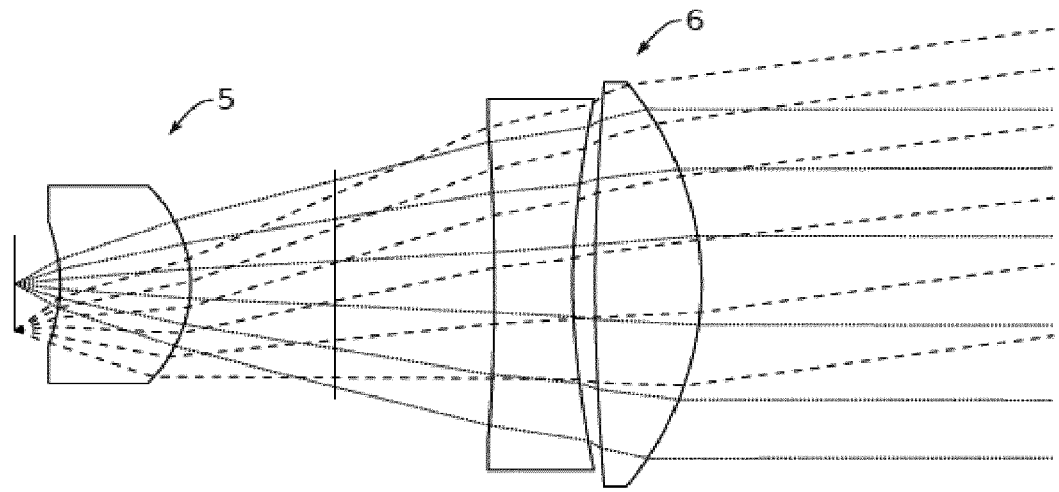

FIG. 2B provides one example of paths of light rays according to this embodiment, from various pixels of source 1.

Figure 3A:
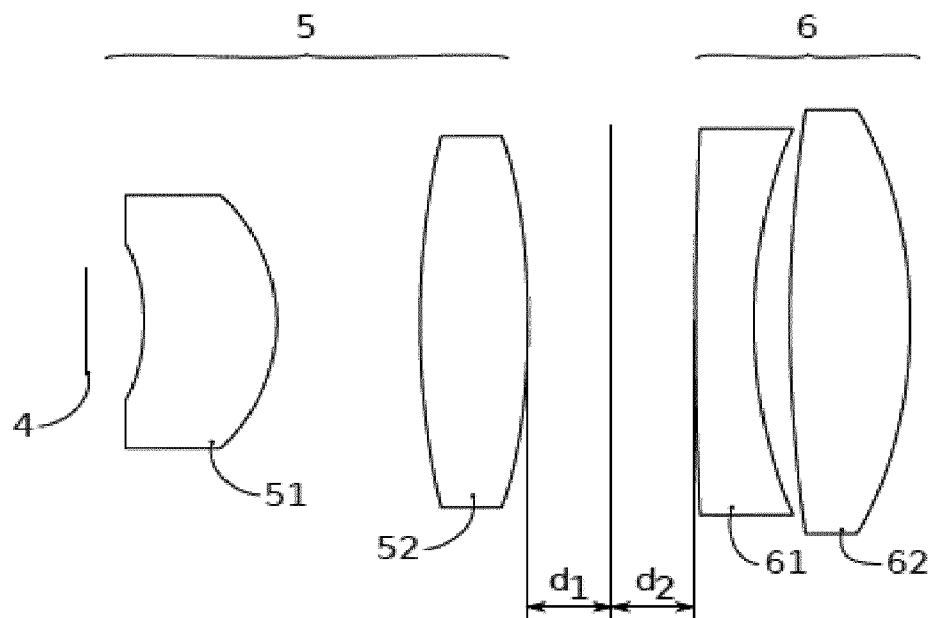
FIGS. 3A and 3B show a second embodiment of an optical device.
Figure 3B:
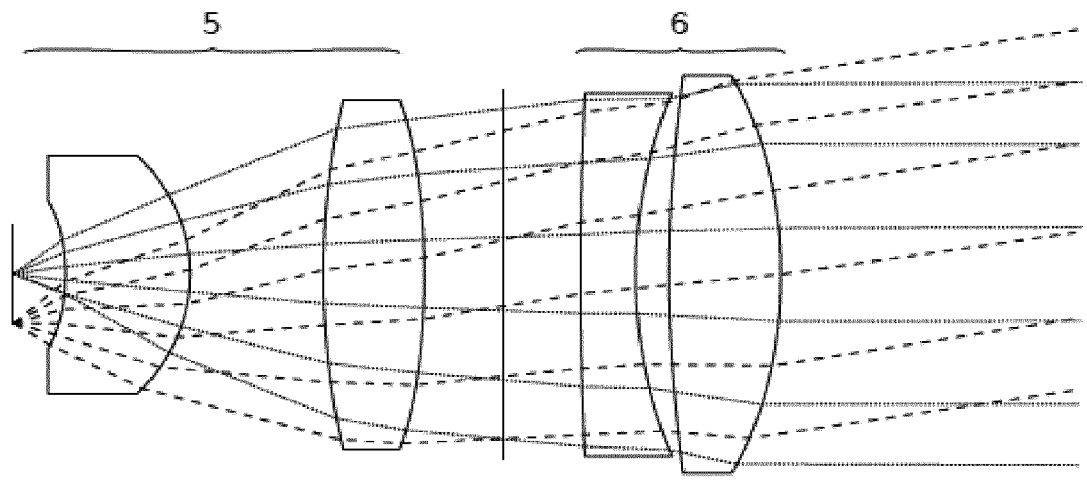

FIGS. 3A and 3B show a variant of the situation described above.

Thus, the first optical unit 5 has in this case a second lens 52 of convergent nature. As above, even though the illustration shows a biconvex lens, other arrangements allowing convergence to be ensured are possible. In this configuration, the exit dioptric interface of the first unit 5 is formed by the exit face of the lens 52. It is then with respect to this face that $d_1$ is measured.

The path of the corresponding rays is shown in FIG. 3B.

Figure 4A:
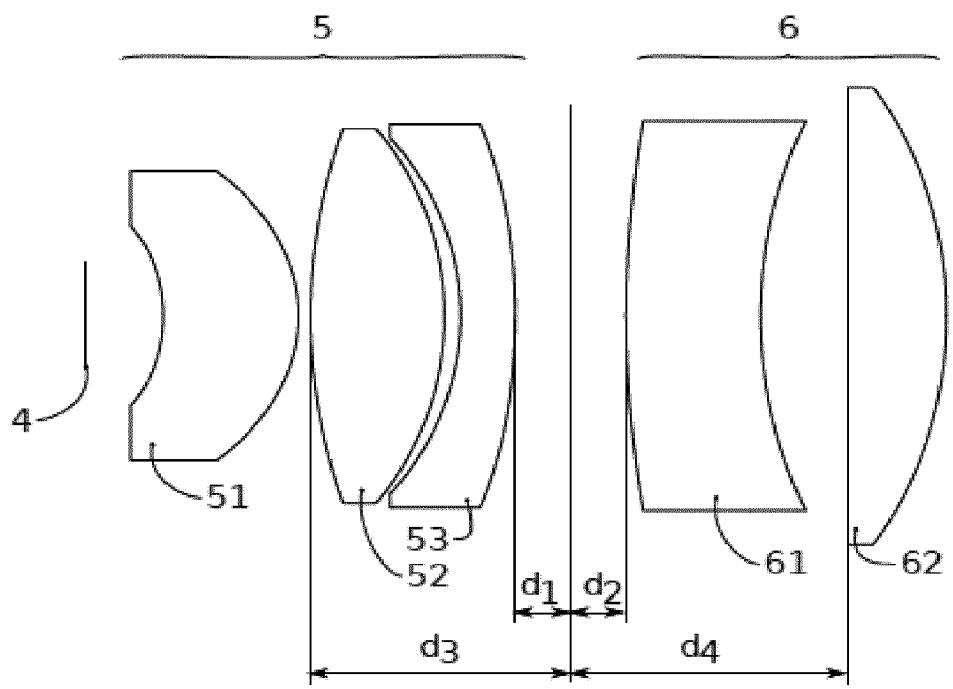
FIGS. 4A and 4B show a third embodiment of an optical device.
Figure 4B:
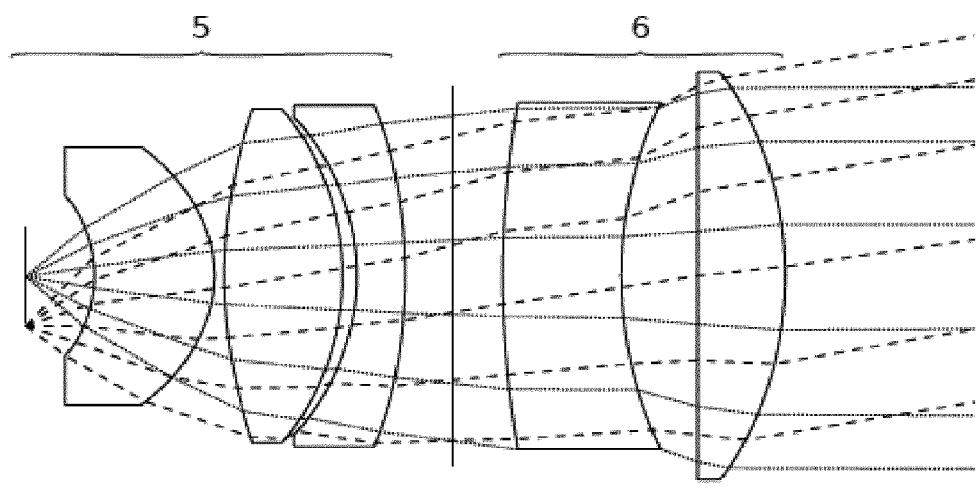

In the situation represented in FIGS. 4A and 4B, the optical unit 5 is more complex in that three lenses 51, 52, 53 are associated. The lens 51 may be equivalent to those described above with regard to the other embodiments. As above, it may set the field of projection. It is, in this configuration, followed by a doublet associating a lens 52 and a lens 53.

The lens 52 is convergent in nature; it is preferably made of crown glass and, advantageously, has a high refractive index, in particular of at least 1.5, or even 1.65. As in the embodiment of FIG. 3A, it is biconvex in the illustration, but other shapes are possible.

The lens 53 is divergent; it may be made of flint glass; its refractive index may be at least equal to 1.7. It here has a concave entrance face and a convex exit face, but, as mentioned above, there are other ways of achieving a lens of negative power. In this case, it is the exit face of the lens 53 that is used when determining the distance $d_1$.

In this case, there are thus two doublets placed about the pupil 7 with a certain symmetry.

Advantageously, provision is made for these two doublets to have an equivalent optical power (this is considered to be the case when they are identical to within 10%) so as to distribute it about the pupil 7.

Furthermore, FIG. 4A shows the distances $d_3$ and $d_4$ between the entrance face of the first doublet and the pupil 7, and between the pupil 7 and the entrance face of the second lens 62 of the doublet of the second unit optical, respectively. This thus further increases the symmetry of the system. In particular, this makes it possible to distribute the flint-glass lenses and the crown-glass lenses about the pupil 7. Preferably, the flint-glass lenses have an identical refractive index (to within 10%). The same goes for the crown-glass lenses of the two doublets.

It will be noted that, in the preferred configuration, the divergent flint-glass lenses are the elements closest the pupil 7 whereas the convergent crown-glass lenses are exterior elements of this pair of doublets.

FIG. 4B shows an example of the path taken by rays in this configuration.

Optionally, the refractive index of the lens 51 may be equal (to within 10%) to the index of the crown glass of the corresponding lenses of the doublets.

Optionally, the device may comprise more than five lenses. In particular, the second optical unit may be equipped with (at least one or) more than one additional lenses following the doublet and preferably of convergent nature. The flint- and crown-glass lenses may also be alternated.

The invention is not limited to the embodiments described above and extends to all the embodiments covered by the claims.

The invention claimed is:

1. An optical device comprising: a first optical unit, a pupil and a second optical unit arranged in succession a traveling direction of light rays received by the optical device, wherein:
the first optical unit comprises an exit dioptric interface located at a first distance (d1) from the pupil,
the second optical unit comprises an entrance dioptric interface located at a second distance (d2) from the pupil,
the second distance (d2) is substantially identical to the first distance (d1),
the first optical unit comprises a convergent lens,
the second optical unit comprises a first lens doublet,
one lens of the first lens doublet is made of flint glass and is divergent, and
the other lens of the first lens doublet is made of crown glass and is convergent.

2. The optical device as claimed in claim 1, wherein the first optical unit comprises:
a first convergent lens forming an entrance dioptric interface of the first optical unit; and
a second convergent lens immediately following the first convergent lens.

3. The optical device as claimed in claim 2, wherein the entrance dioptric interface has a meniscus shape.

4. The optical device as claimed in claim 3, wherein the first optical unit comprises a divergent lens, immediately following the second convergent lens.

5. The optical device as claimed in the claim 3, wherein lenses of the first lens doublet of the first optical unit and of the second lens doublet of the second optical unit are flint-glass lenses and crown-glass lenses alternated in the traveling direction of the light rays.

6. The optical device as claimed in claim 3, wherein at least one of the first optical unit or the second optical unit comprises at least one flint-glass lens having a refractive index at least equal to 1.6.

7. The optical device as claimed in claim 2, wherein the first optical unit comprises a divergent lens, immediately following the second convergent lens.

8. The optical device as claimed in claim 7, wherein:
the second convergent lens and the divergent lens form a second lens doublet,
one lens of the second lens doublet is made of crown glass, and
the other lens of the second lens doublet is made of flint glass.

9. The optical device as claimed in claim 8, wherein lenses of the first lens doublet of the first optical unit and of the second lens doublet of the second optical unit are flint-glass lenses and crown-glass lenses alternated in the traveling direction of the light rays.

10. The optical device as claimed claim 9, wherein the flint-glass lenses have an Abbe number <50 and/or the crown-glass lenses have an Abbe number greater than 45.

11. The optical device as claimed in claim 8, wherein:
the second convergent lens comprises an entrance dioptric interface located at a third distance (d3) from the pupil,
the second lens doublet of the second optical unit comprises an exit dioptric interface located at a fourth distance (d4) from the pupil, and
the third distance (d3) and the fourth distance (d4) are substantially identical.

12. The optical device as claimed in claim 8, wherein the first lens doublet of the first optical unit and the second lens doublet of the second optical unit have an identical optical power.

13. The optical device as claimed in claim 7, wherein:
the second convergent lens comprises an entrance dioptric interface located at a third distance (d3) from the pupil,
the second lens doublet of the second optical unit comprises an exit dioptric interface located at a fourth distance (d4) from the pupil, and
the third distance (d3) and the fourth distance (d4) are substantially identical.

14. The optical device as claimed in claim 7, wherein the first lens doublet of the first optical unit and the second lens doublet of the second optical unit have an identical optical power.

15. The optical device as claimed in claim 2, wherein at least one of the first optical unit or the second optical unit comprises at least one flint-glass lens having a refractive index at least equal to 1.6.

16. The optical device as claimed in claim 2, wherein at least one of the first optical unit or the second optical unit comprises, at least one crown-glass lens having a refractive index at least equal to 1.45.

17. The optical device as claimed in claim 2, having a numerical aperture less than 1.

18. A module comprising the optical device as claimed in claim 2.

19. The module as claimed in claim 18, wherein the optical device is configured to receive and project a light beam on the ground.

20. The module as claimed in claim 18, wherein the optical device is configured to receive and project a light beam that forms at least part of an overall high beam.

21. The optical device as claimed in claim 1, wherein the first optical unit and the second optical unit include flint-glass lenses and crown-glass lenses alternated in the traveling direction of the light rays.

* * * * *